Figure 1:
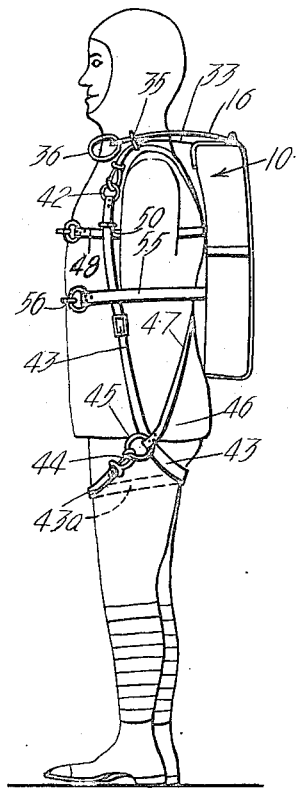

July 17, 1923.

F. SMITH

PARACHUTE PACK AND HARNESS, ETC

Filed April 28, 1919

3 Sheets-Sheet 1

1,462,456

Inventor
Floyd Smith
by
his Attorney

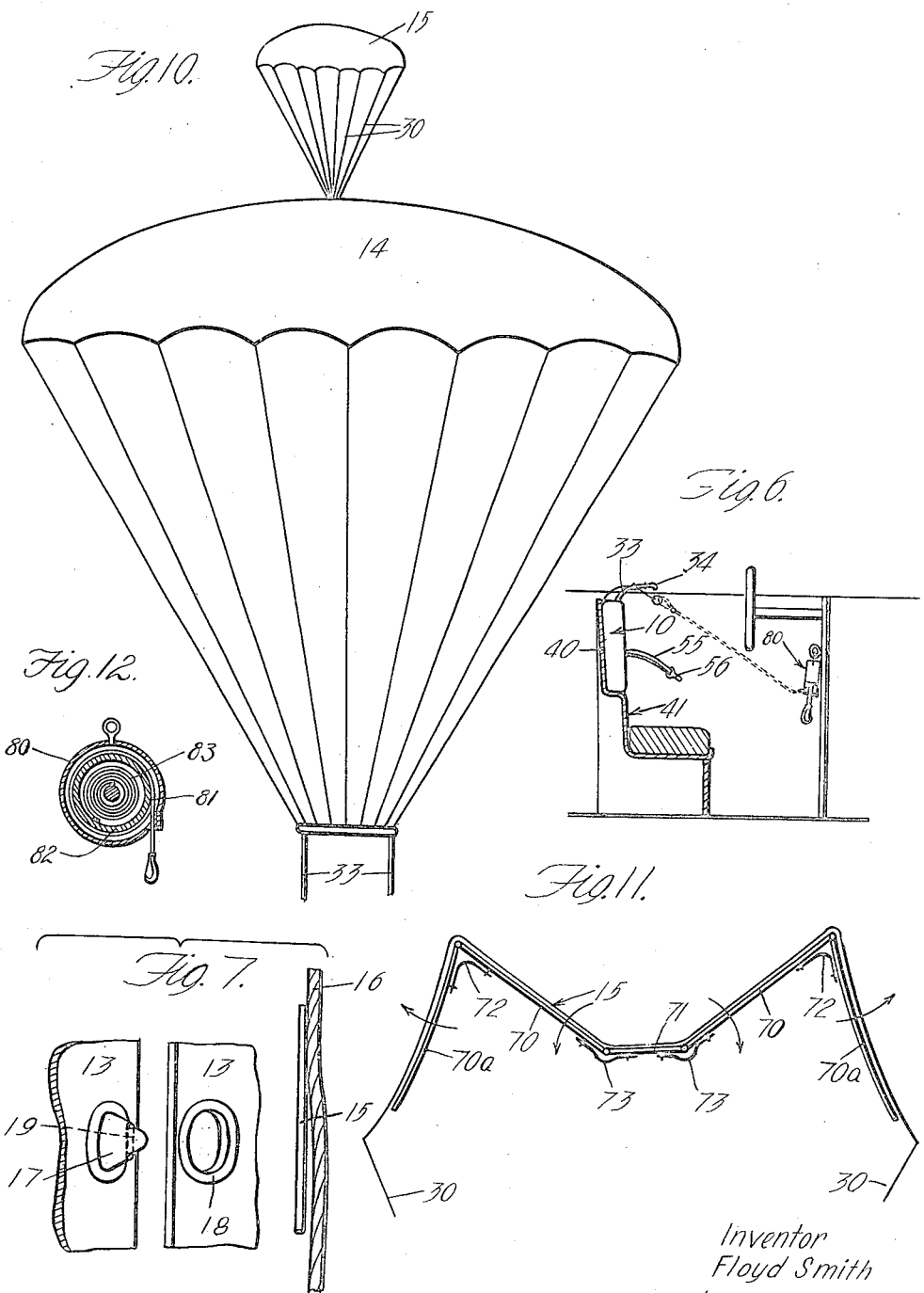

July 17, 1923.

F. SMITH 1,462,456

PARACHUTE PACK AND HARNESS, ETC

Filed April 28, 1919

3 Sheets-Sheet 3

Inventor
Floyd Smith
his Attorney.

Patented July 17, 1923.

1,462,456

UNITED STATES PATENT OFFICE.

FLOYD SMITH, OF DAYTON, OHIO, ASSIGNOR TO FLOYD SMITH AERIAL EQUIPMENT COMPANY, A CORPORATION OF ILLINOIS.

PARACHUTE PACK AND HARNESS, ETC.

Application filed April 28, 1919. Serial No. 293,047.

*To all whom it may concern:*

Be it known that I, FLOYD SMITH, a citizen of the United States, residing at Dayton, in the county of Montgomery, State of Ohio, have invented new and useful Improvements in Parachute Packs and Harness, Etc., of which the following is a specification.

This invention relates to parachute packs and means for carrying and operating the same; relating generally to that type of parachute and pack combination which is set forth in my application Serial No. 246,999, filed July 27, 1918; and among the general objects of the present invention I may mention preliminarily that it is an object to provide a parachute pack which may be used in any of the various ways hereinafter set forth and which will operate infallibly to release the contained parachute or parachutes, allowing the contained parachute or parachutes to go entirely free when the pack is opened; and to provide a specifically improved type of pack which may be used in such combination.

There are many minor objects of the present invention; and some of these have to do with my specific preferred method of using the pack. It will be understood that such a pack as I herein describe may be used in a variety of manners, as hereinafter explained; but I may prefer to use the pack to be mounted upon the aviator's back, either constantly or when the emergency arises, and to be controllable manually by him to open the pack and release the parachute or parachutes when he desires to do so. As in the combination set forth in said prior application, the present arrangement does not depend, for the extension of the parachute or parachutes, upon any connection of the parachute to the air craft; and the rider may, in my preferred arrangement, open the pack and release the parachute at any time he pleases. The parachute then moves out directly down the line of motion, entirely controlled by the air current and not at all interfered with by being attached to the air craft; and the parachute therefore opens in a normal proper manner without putting any excess or unbalanced strain upon itself. In the combination shown in this present application I prefer to use the type of parachute combination shown in my said prior application; and either one or both of said parachutes may be of the type and character specified in my prior application or of the type shown in an application filed on even date herewith and entitled Parachute with adjustable vent.

I will now explain in detail preferred specific forms of parachute pack, and the harness and other arrangements with which it is combined in practice, reference for this purpose being had to the accompanying drawings, in which—

Figure 2:
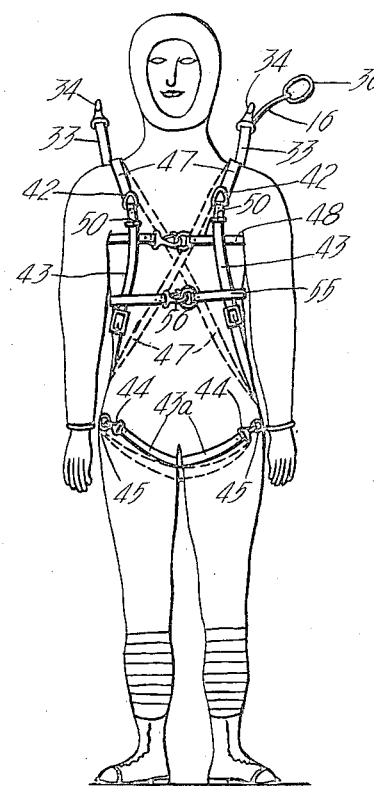
Figure 3:
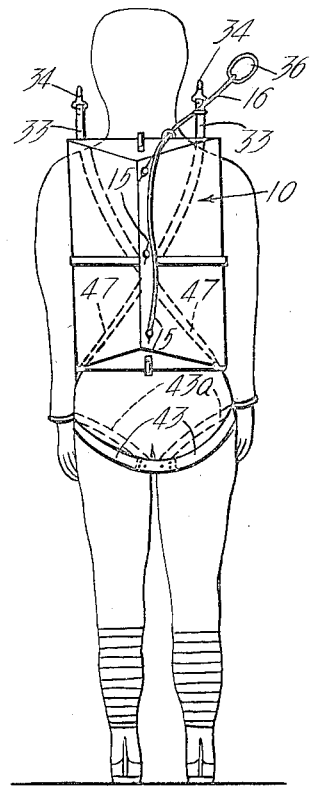
Figure 4:
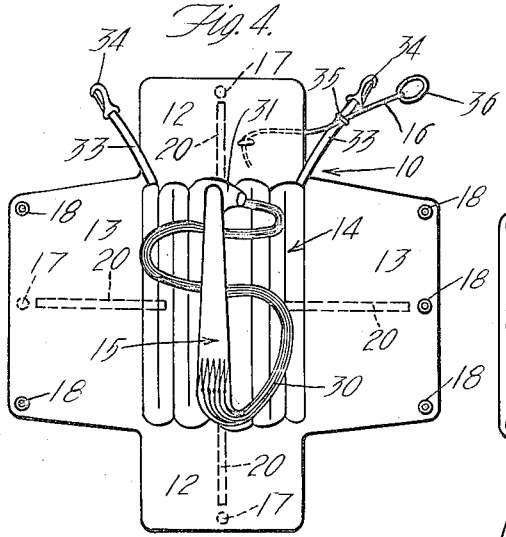
Figure 5:
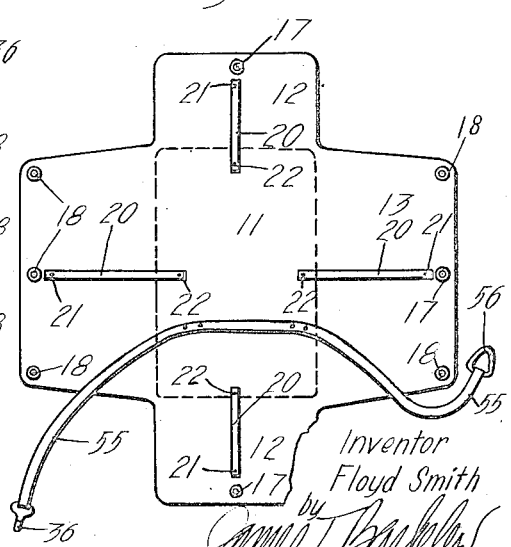
Figure 8:
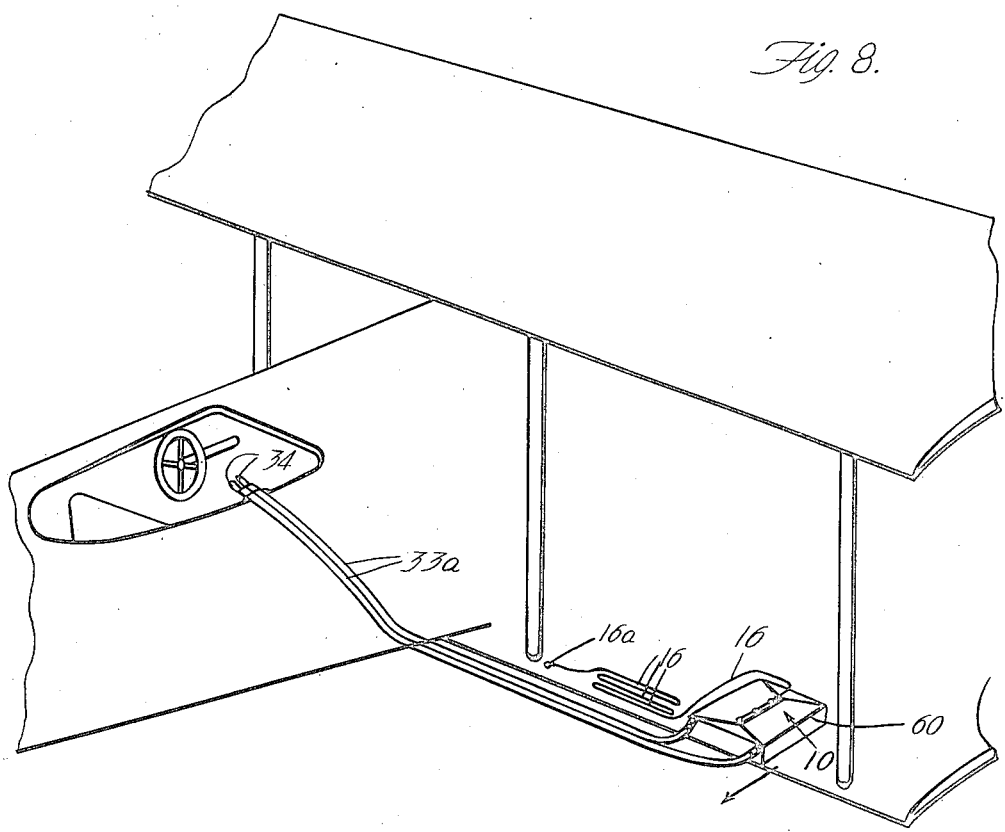
Figure 9:
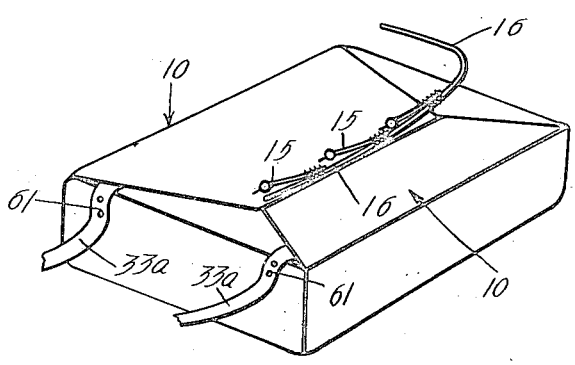

Fig. 1 is a side view of a person equipped with my improved form of harness and wearing the parachute pack, showing the pack fully attached; Fig. 2 is a front view showing the arrangement just before the suspension straps are attached to the harness; Fig. 3 is a rear view showing a similar condition; Fig. 4 is a view showing the pack opened out; Fig. 5 is a reverse view of the opened pack; Fig. 6 is a small view showing how the pack may be mounted in a recess in an airplane seat directly behind an aviator; Fig. 7 is a detailed view illustrating how the pack may be releasably held folded; Fig. 8 is a perspective illustrating a method of mounting the pack in a fixed position in some part of an aircraft; Fig. 9 is a view illustrating the modifications in the pack construction used in such a situation as shown in Fig. 8; Fig. 10 is a small view illustrating the parachute arrangement which may be used in such a pack as herein described; Fig. 11 is a sectional view illustrating a spring opening construction which may be used for a small pilot parachute or for either one or both the parachutes; and Fig. 12 is a sectional view of the spring device that may be used in connection with opening the pack.

In the drawings I show at 10 a pack embodying a container preferably made of some flexible material, as for instance, some water-proof fabric. This container is preferably made of a single piece of such flexible material, or of several pieces joined together so as to be in effect one integral piece; and the general outline of the flexible material is shown in Fig. 4 and Fig. 5. The flexible piece embodies a back portion 11, two end flaps 12, and two side flaps 13. These end and side flaps are folded over the contained parachutes 14 and 15 in the manner which will readily be understood from the drawings without detailed description. Any suitable means, easily releasable, may be utilized for holding the flaps in their folded position; and for this purpose I prefer to utilize a plurality of wire pins 15 mounted upon a suitable pull cord or pull cable 16. These pins engage with the flap in any suitable manner; but I may prefer to use the construction shown in detail in Fig. 7, embodying a conical button 17 mounted on one of the flaps and an eyelet 18 mounted on another flap, the conical button having a hole 19 through which the wire pin 15 is adapted to pass. In my preferred construction there are buttons 17 at the places indicated in Figs. 4 and 5 and eyelets 18 at the several places indicated. The two end flaps 12, which are folded underneath are provided with buttons 17, and these buttons 17 take two eyelets 18, one on each side flap 13, as will be readily understood.

In order to cause quick and free opening of the pack, so as to freely release the parachute or parachutes contained within it, I provide rubber or other elastic bands at 20, these bands being attached at their ends at 21 at points near the outer edges of the flap and at 22 to the back 11 of the pack. When the pack is folded these elastic bands are placed in tension, as they are somewhat shorter (when unexpanded) than the length of material between their fastened ends. Consequently when the edges of the flaps are unfastened by pulling upon the pull cords 16, these elastic bands tend instantly to pull the edges of the flaps apart and to throw the pack open to the position indicated in Fig. 4, thus freely releasing the contained parachute or parachutes.

The parachute arrangement which I prefer to use in my pack is that shown in my said prior application, although it will be understood that each individual parachute may be of any specific construction, as that of my said co-pending application filed on even date herewith. In accordance with that arrangement the small pilot parachute 15 is one which is equipped with spring opening means such as will cause this parachute to open immediately and quickly whenever the surrounding pack is released. The shroud cords 30 from this parachute are attached to the top 31 of the main parachute 14 which is folded in the pack, the folding being done in such a manner as to allow the main parachute to quickly free itself and be pulled out straight by the pilot parachute. The supporting straps 33 of the main parachute (the straps which are hooked into the supporting harness worn by the parachute rider) extend out of the folded pack and are provided at their ends with snaps 34 for quick attachment to the harness. The pull cord 16 may preferably pass through a ring or loop 35 on one of straps 33, the pull cords being thereby held in convenient position so that the ring, or other handle, 36 on its end is put in convenient position to be grasped by the parachute rider to pull the cord 16 and thus release the pack.

The pack may be constantly worn by the aviator or it may be carried in the air craft in any suitable manner. For instance, it may be carried as shown in Fig. 6 in a recess in the back 40 of aviator's seat 41, the straps 33 extending forwardly over the aviator's shoulders, or being directly behind his shoulders, convenient to be grasped by him to quickly snap the snaps 34 into the rings 42 on the supporting strap 43 of his harness. Supporting straps 43 may pass downwardly and to the sides, and thence rearwardly around the legs and across the seat, leg straps 43ª attaching to the strap 43 and extending around inside the legs and their ends being provided with snaps or other means at 44 for hooking into rings 45 which are attached at 46 to the straps 43. At this same point 46 the back straps 47 attach to the straps 43. These back straps 47 are crossed across the back and come forward over the shoulders and attach to a chest strap 48 encircling the chest. Now the upper ends of straps 43 may, if desired, be made integral with the straps 47, or they may preferably be connected to the straps 47 and thereby to the chest strap 48 in such a way that upward pull on the supporting straps 43 will not displace the chest strap 48 or put any upward pulling strain upon it; the rider being thus supported entirely by his seat upon the straps 43. For this purpose the straps 43 may pass through loops or rings 50 attached to the straps 47 at a point near the chest strap.

In order to attach the pack to his back it is only necessary for the aviator to snap the belt strap 55 around his body, this being provided with a snap and loop arrangement at its ends at 56 for purposes of quick coupling. The belt strap 55 is attached to the fabric of the pack 10 in any suitable manner, strongly enough to hold the pack in proper position. The upper end of the pack is held in position on the aviator's back by the straps 33 being hooked into place as hereinbefore described.

In Figs. 8 and 9 I show an arrangement illustrating how my pack may be carried in any suitable position on an air craft; and I shall now describe how, with the pack carried in any such position, the pack may be operated and released to effect substantially the same results as herein described. The pack 10 may be carried in a suitable compartment 60 in any part of the aircraft, as in the wing of the airplane, the pack being removable from the compartment by pulling out endwise or pulling upwardly. In this particular case the straps 33ª, which are the supporting straps from the main parachute, extend out of the pack as hereinbefore described and are then fastened to the pack at 61, and then extend to some convenient point on the airplane and have at their ends the snaps 34 to hook into the harness. The pull cord 16 in this case may be of considerable length and may be secured at 16ª to the airplane if desired, instead of passing along the straps 33 and having a handle or ring at the aviator's shoulder for manual operation. This cord 16 may be suitably coiled in any preferred manner to insure its free pulling out when the pack is pulled away. In using this form of device the aviator attaches the snaps 34, and then, without the necessity of attaching the pack to his back, he jumps from the plane. His weight upon the straps 33ª first pulls the pack from the plane and when the pack has moved away from the plane far enough to straighten out the cord 16, then the cord 16 is pulled and releases the pack and allows it to open. The parachute immediately comes out of the pack, the small pilot parachute dragging the large parachute out with it and straightening out the large parachute so that the large parachute then takes hold in a natural and proper manner.

The opening device 80 may be used in connection with the pack if desired. The cord 81 which is normally kept wound on drum 82 by spring 83 may be pulled out and the hook at the end of cord 81 may be engaged in ring 36 as shown in dotted lines in Fig. 6. The aviator may then jump from the machine and allow the pack to be opened by cord 81. The cord 81 will open the pack as soon as it is completely unwound and pulled tight.

It is to be particularly noticed, in any of the adaptations of my pack, whether the pack is opened by manual operation (which is perhaps the preferred method) or whether it is opened by the pulling of a cord attached to the air craft; that the extension of the parachute or parachutes is not at all caused by any attachment to the plane but is caused entirely by the stream of air catching the chute or chutes and pulling them out directly behind on the line of motion. The main parachute is thus caused to operate in perfect equilibrium and balance, and to open freely and properly without its opening being interfered with in any manner by attachment to the air craft.

In Fig. 10 I illustrate the general arrangement of pilot parachute 15 and main parachute 14, herein spoken of, and particularly set forth in my said prior application. In Fig. 11 I show a spring opening construction which may be used for one or both parachutes. For instance, I may use the spring opening construction on the pilot parachute 15; and the effect of this spring opening construction is to immediately spring. the small pilot parachute open as soon as the pack is released, thus causing the pilot parachute to immediately take the air and to drag out the main parachute 14, dragging this parachute out in a straight line back along the line of movement. As an instance of this spring opening construction the parachute 15 may be provided with pivoted ribs 70 and 70ª pivoted together so as to make a sort of jointed rib construction, and these ribs are pivoted to a central piece 71. Suitable spring means may be used, as for instance, flat springs 72 and 73, tending to throw the ribs around in the directions indicated by the arrows and to open the parachute. The parachute is folded by the ribs being moved in the directions opposite to those indicated by the arrows; so that the parachute can be folded, more or less like an umbrella, into a small compass and in such a manner so as to always be ready for instantaneous opening when the pack is released.

Having described a preferred form of my invention, I claim:

1. A parachute pack adapted to hold a folded parachute, embodying a sheet of flexible material with flaps adapted to be folded about the parachute, means for connecting said pack to the body of a rider, releasable means for holding the edges of the flaps together, and a pull cord extending from said releasable means to a point convenient to be operated by the rider.

2. In a parachute pack adapted to hold a folded parachute, a sheet of flexible material with flaps adapted to be folded about the parachute, releasable means for holding the edges of the flolded flaps together, and elastic means to throw the flaps open when released.

3. In a parachute pack adapted to hold a folded parachute, a sheet of flexible material with flaps adapted to be folded about the parachute, releasable means for holding the edges of the folded flaps together, and elastic bands secured each at one end to a flap and at the other end to the body of the flexible material and of such length as to be put in tension when the flexible material is folded about the parachute.

4. In combination, a body harness, a releasable pack adapted to hold a folded parachute, a parachute folded therein and having supporting straps attachable to the harness and serving to both attach the parachute and the pack to the harness.

5. In combination, a harness adapted to support the body, a releasable pack adapted to hold a folded parachute, a parachute folded therein and having supporting straps attached to the harness, said supporting straps serving to hold the pack to the harness until the pack is opened and the parachute released.

6. In combination, a harness adapted to support the body, a releasable pack adapted to hold a folded parachute, a parachute folded therein and having supporting straps attached to the harness, means whereby the lower part of the pack is attached to the body, and said supporting straps serving to hold the upper part of the pack to the harness.

7. A parachute pack embodying a flexible material adapted to be folded about a parachute, and releasable means for holding the folded parts of the material embodying conical buttons set on one folded part and projecting through another folded part, and a pin through the conical button.

8. In combination, a harness adapted to support the body, a releasable pack adapted to hold a folded parachute, a parachute folded therein and having supporting straps attached to the harness, said supporting straps serving to hold the pack to the harness until the pack is opened and the parachute released; said pack embodying a flexible sheet adapted to be folded about the parachute, releasable means for holding the sheet in folded condition, and a releasing cord extending from the pack to a point convenient to be grasped by the person.

9. A container for a parachute comprising an approximately rectangular flexible sheet having flaps at its four edges, one of said flaps having thereon a plurality of conical projections and the opposing flap having a plurality of eyes so shaped and positioned as to pass over said projections when the two flaps containing the projections and the eyes are folded inwardly, said projections having holes extending through the same near their outer ends, and a release member provided with a plurality of pins each adapted to enter the hole in one of said projections.

10. In combination, a parachute folded into a compact mass, a container for the folded parachute having a plurality of flexible flaps adapted to form a closure for the container, releasable fastening means for holding the edges of the flaps together, and elastic means to throw the flaps open when released.

11. The combination with a parachute folded into a compact rectangular mass, of a flexible sheet comprising a rectangular body portion and flaps at the four edges, said sheet being folded about the parachute with the flaps all lying on one of the larger sides of the rectangular mass, a series of releasable fastening devices for securing the flaps in the folded condition, a releasing element for each fastening device, and a single pull cord connected to said releasing elements for actuating the same.

12. A parachute pack adapted to hold a folded parachute embodying a sheet of flexible material comprising a body portion having flaps at the four sides thereof, releasable fastening means for holding the edges of said flaps together when the flaps are folded across said portion on the same side of the latter, and a single pull cord extending from said fastening means to a remote point to release the fastening means.

13. A parachute pack adapted to hold a folded parachute embodying a sheet of flexible material adapted to be folded about the parachute, releasable fastening means for securing the edges of the sheet to maintain the sheet in the folded condition, and elastic bands each attached to the sheet in the vicinity of one of the edges and extending transversely to that edge to a remote attaching point on the sheet, the length of each band in its unexpanded condition being less than the width of that portion of the sheet lying between the ends of the band when that portion of the sheet is in a flattened condition.

14. A container for a folded parachute comprising a plurality of flaps adapted to overlap each other when folded inwardly to close the container, some of said flaps having conical buttons, other of the flaps having eyes adapted to receive said conical buttons, and pins passing detachably through said conical buttons to hold said eyes thereon.

15. The combination with a parachute folded into a compact rectangular mass, of a flexible sheet comprising a rectangular body portion and flaps at the four edges, said sheet being folded about the parachute with the flaps all lying on one of the larger sides of the rectangular mass, a series of releasable fastening means arranged in line for securing the flaps in the folded condition, and a single pull cord extending along said fastening means to release the same.

16. A parachute pack adapted to hold a folded parachute, said pack comprising a body portion and flaps co-operating with the body portion to form a closed container, releasable means for holding the edges of said flaps together, and elastic strips each secured at one end to one of the flaps and at the other end to another part of the pack to throw said flaps open when the flaps are released.

17. The combination with a parachute folded into a compact mass, of a pilot parachute attached to the apex of the main parachute, a sheet of flexible material comprising a body portion approximately rectangular in shape and flaps at the four edges of the body portion, said sheet being folded about the parachutes with the flaps overlying each other, releasable fastening means for holding said flaps together, and a pull cord extending from said fastening means to a remote point to release the fastening means.

18. The combination with a parachute folded into a compact mass, of a flexible sheet comprising a body portion approximately rectangular in shape and flaps at the four edges, said sheet being folded about the parachute with the flaps overlapping each other on one side of the pack, a plurality of releasable fastening means for holding said flaps together and producing a tight closure, and a pull cord connected with said fastening means to release the same.

19. The combination with a parachute pack, of a harness adapted to support said pack upon the back of a wearer, said pack being provided with a plurality of flaps, a series of releasable fastening means for securing said flaps together; each fastening means consisting of a conical button on one flap, an eyelet on another flap, and a detachable pin extending through said button; a single release cord extending past said fastening means and secured to all of the pins thereof.

20. The combination with a parachute pack, of a harness adapted to support said pack upon the back of a wearer, said pack being provided with a plurality of flaps, a series of releasable fastening means for securing said flaps together; each fastening means consisting of a conical button on one flap, an eyelet on another flap, and a detachable pin extending through said button; a single release cord extending past said fastening means and secured to all of the pins thereof, and a guide on said harness for said cord in a position to cause said cord to extend forwardly over the shoulder of the wearer.

21. The combination with a parachute folded into a compact mass, of a container for said parachute having flaps adapted to be folded over the parachute to form a closure for the container, releasable fastening means for securing said flaps together, and elastic bands each attached at one end to one of the flaps and at its other end to a remote point on the container, the length of each band in its unexpanded condition being less than the distance between the points of attachment of the ends of the band when the flaps are in their closing positions.

In witness that I claim the foregoing I have hereunto subscribed my name this 8th day of April 1919.

FLOYD SMITH.

Witnesses:
Wm. E. Donson,
Warren C. Deem.